United States Patent
Nazaryan et al.

(10) Patent No.: US 6,323,264 B1
(45) Date of Patent: Nov. 27, 2001

(54) CORROSION BARRIER COATING COMPOSITION

(75) Inventors: Nikolay Nazaryan, West Hartford; Stanley S. Orkin, Vernon; Glen Greenberg, Avon, all of CT (US)

(73) Assignee: Turbine Controls, Inc., Bloomfield, CT (US)

(*) Notice: Subject to any disclaimer, the term of this patent is extended or adjusted under 35 U.S.C. 154(b) by 0 days.

(21) Appl. No.: 09/434,192

(22) Filed: Nov. 4, 1999

(51) Int. Cl.$^7$ ............... C08K 3/10; C08L 63/02
(52) U.S. Cl. ............ 523/458; 523/459; 523/466; 525/107
(58) Field of Search .................. 523/458, 459, 523/466; 525/107

(56) References Cited

U.S. PATENT DOCUMENTS

| | | | |
|---|---|---|---|
| Re. 29,092 | 12/1976 | Schiefer et al. | 252/12.4 |
| 4,927,715 | 5/1990 | Mori | 428/645 |
| 4,996,085 | 2/1991 | Sievers | 427/140 |
| 5,219,956 | 6/1993 | Fukuoka | 525/526 |
| 5,239,955 | 8/1993 | Rao et al. | 123/193.4 |
| 5,313,919 | 5/1994 | Rao et al. | 123/193.4 |
| 5,316,790 | 5/1994 | Chan et al. | 427/142 |
| 5,344,515 | 9/1994 | Chenock, Jr. | 156/171 |
| 5,554,020 | 9/1996 | Rao et al. | 418/178 |
| 5,616,633 * | 4/1997 | Wombwell et al. | 523/400 |
| 6,090,869 * | 10/1998 | Orkin et al. | 523/433 |

OTHER PUBLICATIONS

HP Polymer, Inc. High Performance Information Packet from www.HPPolymer.com (4/01).
Franklin Industrial Minerals Typical Property Data Sheet L–135 for Dry Flake Muscovite Mica (10/97).
Franklin Industrial Minerals Typical Property Data Sheet H360 for Wet Ground Muscovite Mica (10/97).
Franklin Industrial Minerals Material Safety Data Sheet for Various Wet Ground Mica and Dry Ground Mica (9/97).
DuPont Product Information Sheet Zonyl ® MP1000 fluororopolymer resin (fluoroadditive) (9/96).
Dow Corning Product Information Sheet Z Moly–Powder molybdenum disulfide (9/98).
DuPont Technuical Information Bulletin TF–7 for Teflon® PTFE, fluorocarbon fiber (4/93).
Ciba Specialty Chemicals Product Data Sheet for Araldite® RD–2 di–Epoxide Reactive Diluent (7/98).
Ciba Specialty Chemicals Material Safety Data Sheet for Araldite® RD–2 Epox Resin Reactive Diluent (10/97).
Dexter Electronic Materials Division Technical Information Bulletin for Hysol SR1000, SR1010 (7/94).
Dexter Electronic Materials Division Material Safety Data Sheet for Hysol SR1000 (7/94).
Dexter Aerospace Materials Division Product Bulletin for Hysol EA 929NA (9/94).
Dexter Aerospace Material Safety Data Sheet for Hysol EA 929NA (9/94).
HP–Polymer EU–Material Safety Data Sheet (8/96).
Dexter Aerospace Materials Safety Data Sheet for Hysol EA 9369 QT (7/98).
Dexter Aerospace Materials Division Information Leaflet for Hysol EA 9369 (7/95).

* cited by examiner

Primary Examiner—Robert Dawson
Assistant Examiner—D. Aylward
(74) Attorney, Agent, or Firm—Todd E. Garabedian; William A. Simons; Wiggin & Dana

(57) ABSTRACT

The present invention is directed to a corrosion barrier coating composition, comprising an admixture of: (1) about 60 to about 95 wt % of a one-component epoxy resin composition comprising (a) about 10–30% by weight of 4-glycidyloxy, n,n-diglycidyl aniline; (b) about 30–60% by weight of an epoxy resin, wherein the epoxy resin is epichlorohydrin ether of bisphenol A; and (c) about 3–7% by weight of strontium chromate; (2) about 1 to about 30 wt % of polytetrafluoroethylene; and (3) about 1 to about 20 wt % of glass powder, all weight percents being based on the total weight of the composition. The present invention is also directed to a substrate coated with the above corrosion barrier coating composition, and a method of coating a substrate with the above composition.

10 Claims, No Drawings

CORROSION BARRIER COATING COMPOSITION

BACKGROUND OF THE INVENTION

1. Field of the Invention

The present invention relates to a corrosion barrier coating composition, and more particularly to a corrosion barrier coating composition comprising an admixture of (1) a one-component epoxy resin composition, (2) polytetrafluoroethylene (TEFLON) powder, and (3) glass powder. The present invention is also directed to a substrate coated with the corrosion barrier coating composition of the invention, and a method of coating a substrate with the corrosion barrier coating composition of the invention.

2. Brief Description of the Art

Corrosion barrier coatings are useful in a wide variety of industrial applications to provide metal parts with protection from natural elements such as water, carbon dioxide, salts spray, oxygen, ozone, UV radiation, and the like. In particular, corrosion barrier coatings have proven useful in aircraft and industrial equipment, where severe environmental conditions can occur. For example, aircraft fuel and oil pump housings frequently require repair because they corrode during use. This corrosion reduces the longevity of the housings and results in costly rebuilding, repair, or replacement.

The prior art is replete with corrosion-inhibiting compositions for use in a variety of purposes. However, most of these compositions provide only a thin coating of corrosion barrier to the substrate. While thin coatings may offer adequate protection against corrosion, the thin nature of the barrier makes them more susceptible to damage and corresponding loss of corrosion protection in the damaged area.

Representative patents describing corrosion inhibiting coatings include the following:

U.S. Pat. No. 4,996,085 discloses coating a pump housing surface with a composition comprising a hardenable epoxy resin, a reinforcing filler, and an agent having a lower coefficient of friction than the epoxy resin. Graphite may function as the reinforcing filler, and the frictional reducing agent may be either graphite, in fibrous or granulated form; fluorinated carbon (i.e., —($CF_x$)— wherein x<2); or molybdenum disulfide. Further, the preferred class of epoxy resin is a diglycidyl ether of a dihydric phenol (e.g., the diglycidyl ether of bisphenol A).

U.S. Pat. No. 5,316,790 discloses a lubricative coating and filler material for restoring metal surfaces that have become scratched, scored, grooved, or otherwise damaged to a functional condition. This coating and filler material is a mixture of an epoxy resin, tungsten disulfide, and isopropyl alcohol in a ratio of 9:1:1.6.

U.S. Pat. Nos. 5,603,818 and 5,385,655 disclose a method of producing an adherent and corrosion-inhibiting multilayer coating on metal parts by electrolizing a first composition made from water emulsions, dispersions, or solutions based on water-dispersible or emulsifiable synthetic resin such as alkyd resins, acrylic polymers, melamine resins, and the like. A second coating, comprising at least one film-forming organic resin, is applied over the first coating.

U.S. Pat. No. 5,753,316 discloses a method of treating metal surfaces by coating those surfaces with a film-forming sealcoat containing at least one organic resin and at least one torque modifier. The organic resin is made from water emulsions, dispersions, or solutions based on water-dispersible or emulsifiable synthetic resin such as alkyd resins, acrylic polymers, melamine resins, and the like. The torque modifier may be one or more fluoroalkene polymers, polyethylene, polypropylene, mica, talc, or calcium carbonate.

U.S. Pat. No. 5,312,491 discloses a rust-inhibiting composition containing oxime-based rust converter compounds formulated with a latex based paint to provide a flexible film coating that acts as a barrier to oxygen and water vapor diffusion to the metal surface.

Copending U.S. patent application Ser. No. 08/568,114 discloses a curable composition useful for repairing worn surfaces on housings comprising an admixture of (1) a mixture of (a) at least one one-component epoxy resin, (b) at least one solvent and (c) at least one reactive diluent, wherein the epoxy resin is present in a major (i.e., at least 50% by weight) amount in the mixture; (2) graphite powder; and (3) polytetrafluoroethylene powder.

Copending U.S. patent application Ser. No. 09/413,566 discloses a low friction coating composition, comprising about 60 wt % to about 95 wt % of a high temperature epoxy, comprising (1) about 30 wt % to about 60 wt % of N,N'-m-phenylene dimaleimide; (2) about 30 wt % to about 60 wt % of bisphenol epoxy resin; and (3) about 1 wt % to about 5 wt % of amorphous silicon dioxide; (B) about 1 wt % to about 30 wt % of molybdenum disulfide; and (C) about 1 wt % to about 20 wt % of polyimide powder.

While these corrosion-inhibiting and low-friction coating materials may be satisfactory for certain applications, there is still need for improved corrosion barrier compositions that are useful on a wide variety of substrates, such as housings of various aircraft and machinery parts, that are exposed to severe environmental conditions. The present invention is believed to be an answer to that need.

BRIEF SUMMARY OF THE INVENTION

In one aspect, the present invention is directed to a corrosion barrier coating composition, comprising an admixture of: (1) about 60 to about 95 wt % of a one-component epoxy resin composition comprising (a) about 10–30% by weight of 4-glycidyloxy, n,n-diglycidyl aniline; (b) about 30–60% by weight of an epoxy resin, wherein the epoxy resin is epichlorohydrin ether of bisphenol A; and (c) about 3–7% by weight of strontium chromate; (2) about 1 to about 30 wt % of polytetrafluoroethylene; and (3) about 1 to about 20 wt % of glass powder; wherein all weight percents are based on the total weight of the composition.

In another aspect, the present invention is directed to a substrate coated with the corrosion barrier coating composition of above composition.

In yet another aspect, the present invention is directed to a method of coating a substrate with a corrosion barrier coating composition, comprising the steps of: (A) coating the substrate with the above corrosion barrier composition; and (B) curing the corrosion barrier composition onto the substrate at a temperature of between 250 and 350° F. for between 0.5 and 5 hours.

These and other aspects will become apparent from the following written description.

DETAILED DESCRIPTION OF THE INVENTION

The present invention is a corrosion barrier composition made from selected components that provides a thicker layer of corrosion protection than the corrosion coatings of the prior art. The composition of the present invention has also been found to bond strongly to the substrate, and together with the thicker nature of the coating, provides for excellent corrosion barrier to protect the underlying substrate, particularly under harsh conditions of salt spray, ozone, oxygen, and the like, found in commercial aircraft and industrial equipment. The corrosion barrier composition of the present invention is particularly useful on magnesium, aluminum or stainless steel aircraft fuel or oil pump housings.

As indicated above, the preferred corrosion barrier composition of the present invention comprises (1) about 60 to about 95 wt % of a one-component epoxy resin composition, such as HYSOL EA929NA, (2) about 1 to about 30 wt % of polytetrafluoroethylene powder; and (3) about 1 to about 20 wt % of glass powder. Each of these components are discussed below.

As mentioned above, the preferred one-component epoxy resin composition used in the composition of the invention is HYSOL EA929NA epoxy resin. As defined herein, the term "one-component" refers to an epoxy resin composition that is pre-catalyzed. The HYSOL EA929NA product is available commercially from the Dexter Aerospace Materials Division of Hysol Aerospace Products (Pittsburg, Calif.). This product contains 4-glycidyloxy, n,n-diglycidyl aniline (Chemical Abstract No. 5026-74-4), which constitutes about 10 to 30% by weight of the epoxy resin composition; a bisphenol A epichlorohydrin polymer (a diglycidyl ether of bisphenol A, Chemical Abstract No. 25068-38-6), which constitutes about 30 to 60% by weight of the epoxy resin composition, strontium chromate (Chemical Abstract No. 7789-06-2), which constitutes about 3 to 7% by weight of the epoxy resin composition, and optionally amorphous silica (Chemical Abstract No. 112945-52-5), which constitutes between about 0 and about 5% by weight of the epoxy resin composition.

The preferred form of polytetrafluoroethylene is polytetrafluoroethylene powder, also known as "TEFLON" powder. This powder is a fluorinated carbon polymer of the formula —$(CF_x)$— where x=2. The preferred polytetrafluoroethylene powder used in the composition of the present invention is ZONYL MP1000, polytetrafluoroethylene powder available from DuPont Fluoroproducts (Wilmington, Del.), and has particle sizes ranging from 8–15 $\mu$m. Alternatively, other polytetrafluoroethylene powders or polytetrafluoroethylene flocks may be used. The typical particulate sizes for the ZONYL MP1000 polytetrafluoroethylene powder is from 0.3 to 20 microns.

The glass powder component (also known as soda-lime glass or oxide glass, CAS #65997-17-3) used in the composition of the invention is preferably 325 mesh and is available commercially from Universal Ground Cullet, Inc. (Brookpark, OH), among other suppliers. In one nonlimiting embodiment, the glass powder used in the composition of the present invention is made from about 72.5 wt % silicon dioxide, 0.4 wt % aluminum oxide, 9.75 wt % calcium oxide, 13.7 wt % sodium oxide, 3.3 wt % magnesium oxide, and 0.1 wt % potassium oxide.

In the composition of the present invention, the one-component epoxy resin composition preferably comprises from about 60 to about 95 wt % of the composition, and more preferably from about 65 wt % to about 92 wt %, based on the total weight of the composition. A particularly useful amount of the one-component epoxy resin composition is 85 wt %, based on the total weight of the composition. The polytetrafluoroethylene component preferably comprises from about 1 wt % to about 30 wt % of the composition, and more preferably from about 5 wt % to about 20 wt %, based on the total weight of the composition. A particularly preferable amount of the polytetrafluoroethylene component is 10 wt %, based on the total weight of the composition. The glass mesh component preferably comprises from about 1 wt % to about 20 wt %, and more preferably from about 3 to about 15 wt %, based on the total weight of the composition. A particularly preferable amount of the glass powder component of the composition is 5 wt %, based on the total weight of the composition. One particularly preferred composition of the present invention is 85 wt % of HYSOL EA929NA, 10 wt % TEFLON powder, and 5 wt % glass powder (325 mesh), all weights being based on the total weight of the composition.

In some applications, such as spray applications described below, it may be advantageous to thin the corrosion barrier coating composition of the invention with a solvent prior to application so that the material is applied evenly and does not clog the spraying equipment. A useful solvent for this purpose is a combination of 10–40 wt % methyl isobutyl ketone and 60–90 wt % propylene glycol monomethyl ether. Such a solvent is sold by Dexter Electronic Materials under the tradename AD2002 Thinner. A useful alternative solvent is methylene chloride. The amount of solvent useful in the composition of the present invention generally depends on factors such as desired evaporation rate, type of spraying or other application equipment, desired thickness of the applied coat, and the like understood and easily determined by those of skill in the art. Nonlimiting useful amounts of solvent useful in the composition of the present invention solvents generally range from about 10 wt % to about 90 wt %, based on the total weight of the composition. Amounts of solvent may also be used outside this preferred range if the particular application so demands.

Other fillers such as graphite powder or fiberglass fibers may be optionally added in amounts from 0 to about 5% by weight of the admixture. The composition may also optionally contain color additives, metal powders, or both. If it is desirable to use a metal powder, then silver powder, copper powder or aluminum powder as well as tungsten selenide, tantalum sulfide, molybdenum diselenide and boron nitride in amounts from about 0.5% to 20% of the composition may be used to achieve different corrosion resistance characteristics for specific applications.

To prepare the composition, the above materials, as well as any optional ingredients, are preferably mixed together at ambient temperature to form a liquid slurry. Air may be removed from the slurry by mixing under a vacuum. The amount of solvent, if any, added to the slurry is easily determined by those skilled in the art based on the viscosity required for the spray equipment.

The corrosion barrier composition may be applied to a variety of substrates such as magnesium or magnesium alloys, aluminum or aluminum alloys, stainless steel, titanium alloys, brass alloys, carbon steel, and the like. Also, non-metallic substrates such as plastics may be used as substrates. One family of preferred substrates are magnesium, aluminum or stainless steel aircraft fuel or oil pump housings. Besides its preferred use on pump housings, the corrosion barrier composition of the invention may also be used to coat new parts or repair housing parts on pistons, gear boxes, cover assemblies, valve bodies, actuators, cylinders, shafts, bearings, impellers and journals.

In order to ensure adequate bondability and repeatability of the desired products of the coated substrate, metal substrate surfaces to be coated are preferably cleaned and then roughened by grit blasting with a media sufficient to produce surface roughness of 250 RMS (root-mean-square) without exaggerating the peaks and valleys of the undamaged or damaged surface. If grit blasting is employed, the surface is also preferably scrubbed before coating with the composition of the present invention to remove any embedded grit media. The roughened surface may also be preferably subjected to a chemical cleaning before the coating operation.

The corrosion barrier composition of the invention may be applied by brush, spatula, spray, low pressure transfer, or other suitable application method. Preferably, the amount of corrosion barrier coating composition slurry applied to the substrate is in the range of about 0.010 inch (10 mil) to about 0.050 inch (50 mil) in thickness when wet. Since the composition of present invention is in a slurry state before being cured, it can be readily applied onto any surface, including inner diameters and spherical surfaces. For simple shapes, these compositions can be molded into a solid form on a substrate or machined from a solid bar on a substrate into the desired final configuration. For larger surfaces, these compositions may be sprayed onto a substrate and then cured.

After being applied, the corrosion barrier composition that is applied to the substrate is cured by heating the coated substrate to suitable curing temperature for a sufficient amount of time. In order to achieve strong bonding to the substrate, the preferred curing temperatures are from about 250 to about 350° F., and more preferably from about 275 to about 325° F., for between 0.5 and 5 hours, and more preferably from between 1 and 3 hours. A particularly useful curing temperature is 300° F. The cured coating composition may be used as cured on the substrate, or, in certain applications, may be machined to a desired thickness or shape.

The corrosion barrier coating composition of the present invention offers several significant commercial advantages. The compositions are inexpensive to prepare, and are useful in a wide variety of applications where good adherance to the substrate and a thicker, uniform coat of corrosion barrier is required. The compositions can be applied by simple procedures, such as spatula or spraying using common equipment and methods. The compositions are also compatible with a wide variety of substrate materials and configurations, and they have the ability to be machined by either conventional single point tooling, grinding, honing or polishing operations. Furthermore, the viscosity of the compositions of the present invention can easily be adjusted by varying the amounts of the individual components or by addition of solvent. The compositions of the present invention also do not require bonding pressures to ensure excellent adhesion to substrates.

The following Example is provided to better illustrate the present invention. All parts and percentages are by weight and all temperatures are degrees Celsius, unless explicitly stated otherwise.

EXAMPLE 25 grams of the corrosion barrier coating composition was prepared using the components shown in Table I

TABLE I

| Component | Weight (g) | Wt % |
| --- | --- | --- |
| HYSOL 929NA epoxy resin | 21.25 | 85 |

TABLE I-continued

| Component | Weight (g) | Wt % |
| --- | --- | --- |
| ZONYL MP1000 TEFLON Powder (8–15 μm) | 2.5 | 10 |
| Glass Powder (325 mesh) | 1.25 | 5 |

In Table I, the weight percents are based on the total weight of the composition. The materials were thoroughly mixed together by hand for 10 to 15 minutes in a stainless steel crucible. The mixture was then placed in a Bell jar and subjected to a vacuum (about 29 inches Hg) for about 1 hour to remove any air trapped within the mixture.

A magnesium disk (1 inch diameter, 0.5 inch thick) was grit blasted using aluminum oxide grit, and then cleaned with a chemical cleaner. Following cleaning, the corrosion barrier coating composition was applied to the substrate disk with a spatula to a thickness of about 0.015 inch. The coated disk was cured in a convection oven at 300° F. for about 1 hour. The cured coated washer was then machined in a single point tool operation to achieve a coating thickness of about 0.008 inch.

The above cured corrosion barrier composition was subjected to the ASTM-B117 testing procedure to evaluate the performance of the corrosion barrier to salt spray. The corrosion barrier coating did not exhibit any delamination, peeling, or blistering following 200 hours of exposure to the salt spray. In addition, no corrosion was detected on the underlying magnesium substrate.

While the invention has been described above with reference to specific embodiments thereof, it is apparent that many changes, modifications, and variations can be made without departing from the inventive concept disclosed herein. Accordingly, it is intended to embrace all such changes, modifications, and variations that fall within the spirit and broad scope of the appended claims. All patent applications, patents, and other publications cited herein are incorporated by reference in their entireties.

What is claimed is:

1. A corrosion barrier coating composition, comprising an admixture of:
    (1) about 60 to about 95 wt % of a one-component epoxy resin composition comprising
        (a) about 10–30% by weight of 4-glycidyloxy, N,N-diglycidyl aniline;
        (b) about 30–60% by weight of an epoxy resin, wherein said epoxy resin is epichlorohydrin ether of bisphenol A; and
        (c) about 3–7% by weight of strontium chromate;
    (2) about 1 to about 30 wt % of polytetrafluoroethylene; and
    (3) about 1 to about 20 wt % of glass powder;
wherein all weight percents are based on the total weight of said composition.

2. The corrosion barrier coating composition of claim 1, wherein said one-component epoxy resin composition comprises from about 65 wt % to about 92 wt % of said composition, based on the total weight of said composition.

3. The corrosion barrier coating composition of claim 1, wherein said polytetrafluoroethylene comprises from about 5 wt % to about 20 wt % of said composition, based on the total weight of said composition.

4. The corrosion barrier coating composition of claim 1, wherein said polytetrafluoroethylene is in powder form.

5. The corrosion barrier coating composition of claim 1, wherein said glass powder comprises from about 3 wt % to about 15 wt % of said composition, based on the total weight of said composition.

6. The corrosion barrier coating composition of claim 1, wherein said glass powder is 325 mesh glass powder.

7. The corrosion barrier coating composition of claim 1, further comprising a solvent.

8. The corrosion barrier coating composition of claim 7, wherein said solvent comprises from about 10 wt % to about 90 wt %, based on the total weight of the composition.

9. The corrosion barrier coating composition of claim 7, wherein said solvent comprises an admixture of methyl isobutyl ketone and propylene glycol monomethyl ether.

10. The corrosion barrier coating composition of claim 7, wherein said solvent is methylene chloride.

* * * * *